(12) United States Patent
Just et al.

(10) Patent No.: US 6,567,914 B1
(45) Date of Patent: May 20, 2003

(54) APPARATUS AND METHOD FOR REDUCING TRANSMISSION BANDWIDTH AND STORAGE REQUIREMENTS IN A CRYPTOGRAPHIC SECURITY SYSTEM

(75) Inventors: Michael K. Just, Ottawa (CA); Paul Van Oorschot, Ottawa (CA)

(73) Assignee: Entrust Technologies Limited, Ottawa (CA)

(*) Notice: Subject to any disclaimer, the term of this patent is extended or adjusted under 35 U.S.C. 154(b) by 0 days.

(21) Appl. No.: 09/561,249

(22) Filed: Apr. 27, 2000

Related U.S. Application Data (63) Continuation-in-part of application No. 09/120,716, filed on Jul. 22, 1998, now Pat. No. 6,341,164.

(51) Int. Cl.[7] .................................................. H04L 9/00
(52) U.S. Cl. ........................ 713/160; 713/163; 713/278; 380/278
(58) Field of Search ....................... 380/278; 713/163, 713/160

(56) References Cited

U.S. PATENT DOCUMENTS

| | | | | |
|---|---|---|---|---|
| 5,325,432 A | * | 6/1994 | Gardeck et al. | 380/21 |
| 5,361,256 A | * | 11/1994 | Doeringer et al. | 370/60 |
| 5,548,646 A | * | 8/1996 | Aziz | 380/23 |

* cited by examiner

Primary Examiner—Gail Hayes
Assistant Examiner—James Seal
(74) Attorney, Agent, or Firm—Vedder, Price, Kaufman & Kammholz (57) ABSTRACT

An apparatus and methods for facilitating a reduction in data transmission bandwidth removes unnecessary data relating to encryption keys prior to sending a message or storing the encrypted information for a recipient. Encrypted data, such as message data for multiple recipients, is analyzed to determine whether encryption related data for other recipients may be removed.

16 Claims, 7 Drawing Sheets

APPARATUS AND METHOD FOR REDUCING TRANSMISSION BANDWIDTH AND STORAGE REQUIREMENTS IN A CRYPTOGRAPHIC SECURITY SYSTEM

RELATED CO-PENDING APPLICATION

This application is Continuation in Part of application entitled "Apparatus And Method for Facilitating An Encryption Process And/Or Storage Reduction" having U.S. Ser. No. 09/120,716, filed on Jul. 22, 1998, by inventors Dilkie et al., issued as Pat. No. 6,341,164, owned by instant assignee and incorporated herein by reference.

BACKGROUND OF THE INVENTION

The invention relates generally to systems employing cryptography based security, and more particularly to systems employing public key encryption.

Communication systems such as computer networks, telecommunication systems, and other systems are increasingly using cryptography to encrypt information sent electronically. With the increase in electronic commerce, electronic mail communication, and other information that subscribers may wish to keep secret, public key cryptography systems employ an encryption key pair, such as a decryption private key and an encryption public key to decrypt and encrypt data. The encryption public key is typically available in a public key certificate. The decryption private keys are secret keys that are protected by the use of encryption techniques and other techniques to help ensure that an attacker cannot readily obtain this critical key.

Also, communication systems are known that additionally employ digital signing key pairs, such as a signing private key and a signing public key to allow the use of digital signatures so that e-mail, electronic contracts and other data may be uniquely and securely signed by an individual. Such systems are sometimes referred to as dual public key systems. Some dual public key systems generate and use a separate digital signature certificate and a separate encryption certificate that is sent with encrypted data or digitally signed data. The separate certificates contain the respective public key data along with certificate expiry data, and other data, as known in the art. Other dual public key systems use a single certificate that contains both the signature verification public key and the encryption public key.

When a subscriber's certificates expire, the cryptographic system typically generates new certificates. For encryption certificates, it is desirable to keep a history of all decryption private keys so that a subscriber can decrypt old e-mail messages even though the encryption certificates have expired.

Some standards exist that set forth particular requirements so that subscribers may communicate securely with one other, such as the revised versions of the Secure Multipurpose Internet Mail Extensions (S/MIME) standard. With such standards, header data is included in an encrypted message that typically includes key identifying data, allowing a recipient to determine which private decryption key is to be used to decrypt the encrypted message data.

However, an interoperability problem can still arise when a dual certificate system and a single certificate system communicate with one another if a sending unit or receiving subscriber unit misinterprets or ignores the key usage data. For example, a single certificate sending unit, sending data to a dual certificate subscriber unit, may encrypt data using the subscribers' public signing key since it may use the first public key listed in its single certificate which may be the digital signing certificate. For example, this may happen with RSA algorithm keys, which may be used for both encryption and signatures. The message is encrypted using the signing key data. However, for encrypting data, the single certificate system should have used the public encryption key from the encryption certificate. When a receiving unit receives an encrypted message, the unit typically searches a user profile containing the securely stored matching private decryption key to decrypt the message. The matching key is typically found by using a key identifier or by other mechanisms such as inclusion of the public key certificate in the message header. However, when the signing certificate data is used for encryption, a receiving subscriber who expects an encryption key to have been used is typically unable to locate the proper or matching private decryption key. Hence the message cannot be decrypted by the receiving unit. Hence when some systems send an encrypted message, the system does not send the encryption key identifier or certificate to allow decryption by a receiving user, but instead sends the signing key identifier or certificate.

A system that sends or encrypts a message using a signing public key from the signing key identifier or certificate and sends the signing key identifier or certificate to a receiving unit prevents secure communication among users expecting to communicate. Hence conventional cryptographic systems may not be capable of communicating with systems that may improperly encrypt message data. Accordingly, it would be desirable to have a cryptography based system that facilitates detection of an improper encryption process yet allows suitable decryption so that a user may still communicate with a sender that is improperly encrypting information.

Where a sender may wish to send an encrypted message to one hundred recipients, typically an encryption key package is sent for each recipient as part of message header data. An encryption key package may include, for example, key identification data, such as a certificate serial number or unique key identifier data, or other information identifying the named recipient, from which key identifier data may be obtained, along with an encrypted public encryption key separately for each of the one hundred recipients. One copy of the encrypted message data is also sent with the encryption key packages so that a recipient typically needs to retrieve and store all one hundred key identification data entries corresponding to encrypted public encryption key for each recipient. This results in the unnecessary use of bandwidth and memory since each recipient retrieves and stores data associated with the other ninety nine recipients.

Typically when a recipient receives an encrypted message, the message is decrypted and read and then restored in an encrypted manner so that an adversary cannot readily obtain the information off of a memory storage unit such as a computer's hard drive. The required storage increases dramatically when a recipient receives hundreds of e-mail messages on a daily basis. Accordingly, it would be desirable to have a system that facilitates data transmission bandwidth and/or memory storage reduction where message data includes encryption key packages associated with multiple recipients.

Also, some cryptographic systems are known that may re-encrypt entire messages to facilitate a higher level of security, or to conform with security policy data at a recipient's site. For example a system employing a single DES algorithm may also employ a triple DES algorithm to provide additional security through the use of a longer encryption key. However, the storage of the entire message requires a substantial amount of storage space in a receiving unit's memory whether or not the message is re-encrypted.

Consequently, there exists a need for a system that facilitates detection of improper encryption and can correct the improper encryption and/or a system that facilitates a reduction of memory storage for encrypted data for public key cryptography based security systems and other data security systems or that provides a reduction in data transmission bandwidth.

DETAILED DESCRIPTION OF THE INVENTION

Pruning of the message header data allows for a decreased message size. Pruning at the recipient machine facilitates reduced memory storage while pruning at a gateway machine additionally supports bandwidth reduction prior to the retrieval of the message data by the recipient, or transmission to the recipient. Pruning of the message header may be based on associating a particular key package or packages with a recipient or by removing at least one of a plurality of key packages that are known not to be associated with a recipient. A recipient may be a software program, hardware device, or other suitable entity that has access to a private decryption key or keys.

A key package may contain key identification data (KID) that identifies to the recipient, the proper private decryption key to be used for decryption of the encrypted message data. This key identification data may indirectly identify the proper private decryption key such as by identifying the recipient by name (e.g., an ID in the transport header). Thus, the KID can be used to associate a key package with a particular recipient such that the recipient must attempt to determine the proper decryption key from their decryption key history or from some other index or other information.

Pruning may be based on identifying a group to which a recipient belongs and subsequently removing those key packages that do not indicate a group to which the recipient is a member of.

In one embodiment, a method and apparatus for reducing data transmission bandwidth includes one or more recipients sending key identification data (KID) to a gateway server or other apparatus, as part of or separate from, a request or message. The apparatus receives from the requesting recipient, the key identification data associated with the requesting recipient and parts of the header data to determine whether at least one of the plurality of cryptographic key packages that have been received, corresponds to the key identification data received from the requesting recipient. If there is a match, the method and apparatus removes some or all of the key packages that do not correspond to the key identification data sent by the requesting recipient and generates a pruned response effectively removing all cryptographic key packages other than those for the requesting recipient. The apparatus sends the pruned response to the requesting recipient. Accordingly, the gateway server (e.g., mail server or other processing node from which mail messages are retrieved) or other apparatus need not maintain storage key identification data for all potential recipients and also need not access a directory which can reduce the overhead on a gateway server. In addition, the amount of data transmitted through a communication link is reduced since only a key identifier need be sent by a requesting recipient, and in response, the gateway sends only the key package associated with that recipient. If desired, the gateway apparatus can temporarily store and receive message data.

In another embodiment, the gateway processor obtains the key identification data from a directory or database for a requesting recipient. If desired, the pruned message may be stored in memory by the gateway server and as such may be later transmitted to a desired recipient.

Also, an apparatus and methods for facilitating an encryption process for use in systems employing cryptography based security, removes unnecessary data relating to encryption keys prior to storing the data after receipt of the encrypted information from a sender. Encrypted data, such as message data for multiple recipients, is analyzed to determine whether encryption related data for other recipients may be removed and/or whether a proper encrypting process was used. In another embodiment, the apparatus and one method determines whether an improper or undesirable encryption key was used to encrypt encrypted data and re-encrypts the encrypted data with a different encryption process in response to detected improper encryption key usage. As one example, involving the RSA algorithm, received cryptographic key packages are analyzed to determine whether digital signing key information was used to encrypt the message.

In another embodiment, the apparatus and method receives header data containing cryptographic key packages associated with multiple recipients, then re-encrypts ("re-wraps") selected header data that corresponds to a predetermined recipient and stores the re-encrypted message data for later use by the recipient. In another embodiment, no new encryption is performed, but a deletion of unnecessary header data is performed by parsing the header data to determine whether a cryptographic key package corresponds to key identification data associated with a predetermined recipient. Cryptographic key packages not corresponding to the key identification data for that recipient are removed so that the pertinent cryptographic key package data is stored with corresponding encrypted message data for the recipient for later use.

In another embodiment, an ordinal correspondence between the intended recipients and the header key packages is used in order to remove unnecessary key packages for a particular recipient.

Figure 1:
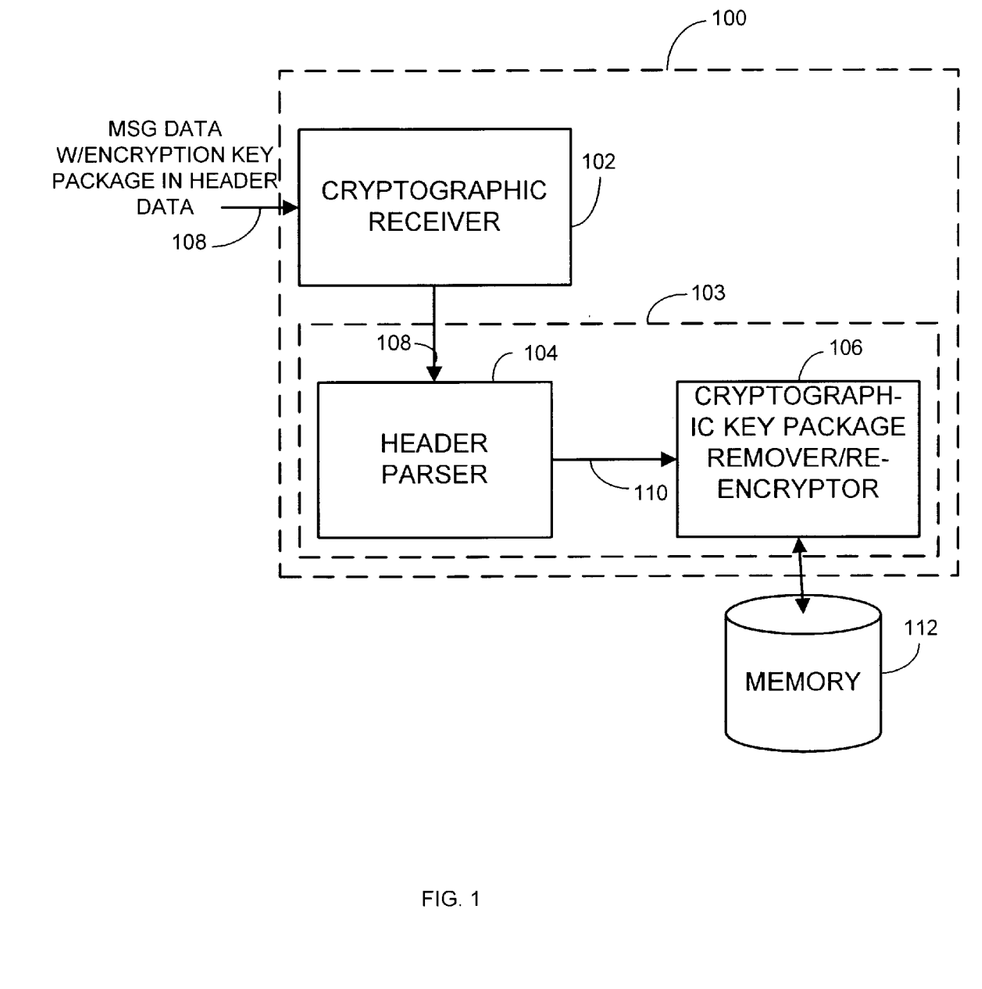
FIG. 1 is a block diagram generally depicting a system for facilitating an encryption process in accordance with one embodiment of the invention.

FIG. 1 shows an example of one embodiment of a memory storage reduction apparatus 100 having a cryptographic receiver 102, an encrypted message data analyzer 103 having a header data parser 104, and a cryptographic key package removal stage 106. The apparatus 100 may be a suitably programmed computer that receives encrypted message data with cryptographic key packages 108. The apparatus 100 may be in each communication unit in a communication system, a subset of units, a gateway computer to which recipients are connected, or any other suitable device. The message data with cryptographic key packages 108 may be an encrypted message, containing any suitable information, sent by a sender to many recipients, such as an e-mail message over a worldwide computer network or an internal company computer network or over any other suitable communication system. As known in the art, an encrypted email message may include two levels of headers and bodies. A first level may include transport information allowing routing of the message (email address, serial number of a computer chip etc) and a body containing a second level cryptographic header with an associated cryptographic message body. The cryptographic key package information is preferably contained as the cryptographic header data that includes a plurality of encryption key packages associated with multiple recipients. Header data as referred to herein is not limited to data preceding other data, but may be located at any location in a data stream or storage unit as long as it is associated with some data. A cryptographic key package may include, for example, a symmetric encryption key wrapped, or encrypted, with an asymmetric encryption key, such as a recipient's public key, as known in the art (this is represented as K1, K2 . . . Kn in FIG. 2). However, any suitable encryption information may be used. The cryptographic body is the encrypted message data.

The cryptographic receiver 102, receives the encrypted message data with the header data and if desired, temporarily stores this data. The cryptographic receiver 102 communicates the received message data with cryptographic key package data 108 to encrypted message data analyzer 103.

Depending upon how the encrypted message data analyzer 103 is configured, the analyzer 103 may remove detected unnecessary cryptographic key package data, re-encrypt message data using a preferred encryption key or any suitable combination of these tasks. The header data parser 104 parses the received cryptographic key packages into separate key packages by standard techniques, such as relying on known data formatting templates and/or field identifiers or markers to distinguish separate packages. The header data parser 104 then communicates the parsed information 110 to the cryptographic key package removal stage 106.

The cryptographic key package removal stage 106 analyzes each cryptographic key package to determine whether at least one of the cryptographic key packages associated with the message data corresponds to key identification data for a predetermined recipient or a group to which the predetermined recipient is known to belong. The cryptographic key package removal stage 106 removes the cryptographic key packages that do not correspond to the key identification data associated with the predetermined recipient or group. The resulting data is preferably only data representing the cryptographic key package (or packages) associated with the predetermined recipient based on the encryption identification data along with the corresponding encrypted message data which is then re-stored in memory 112 for later use.

Figure 2:
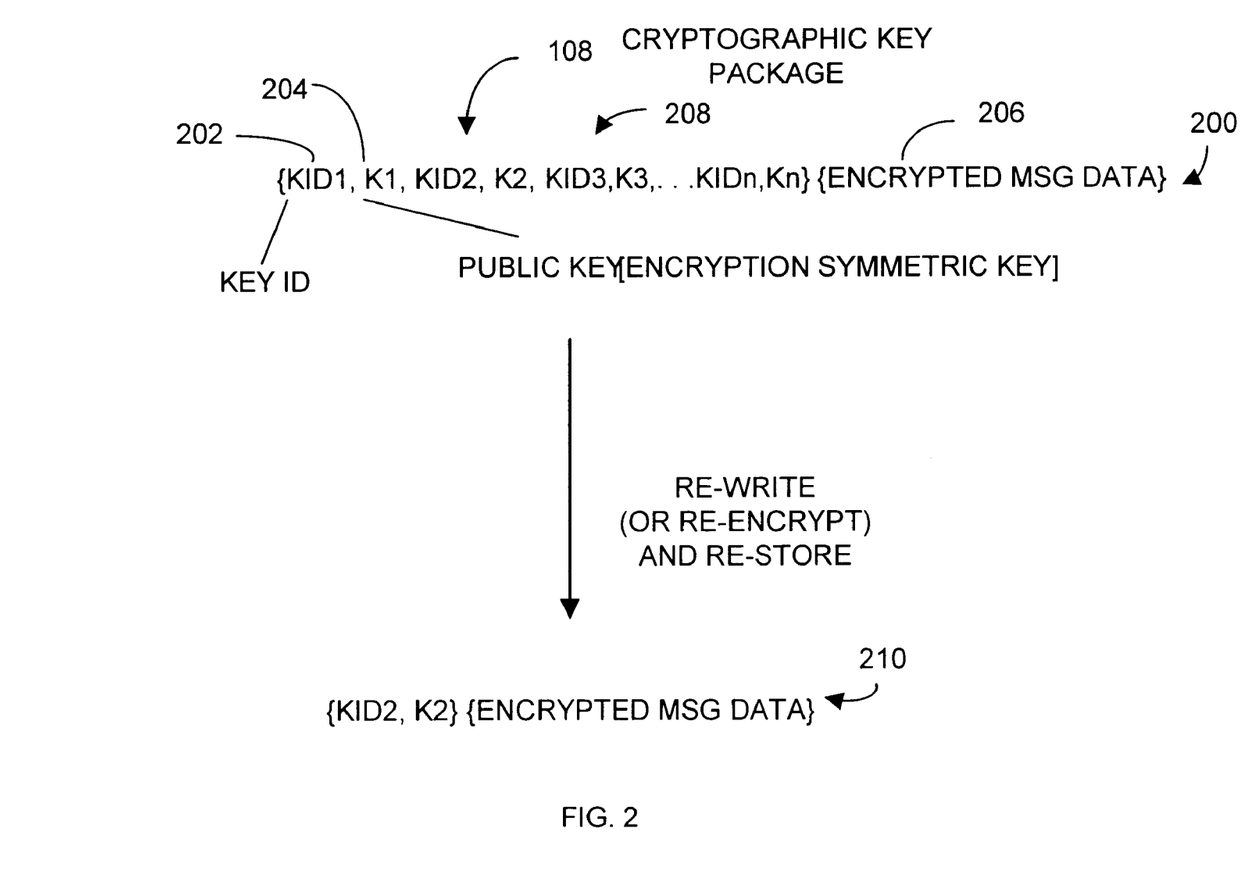
FIG. 2 is a diagram illustrating header data reduction to facilitate memory storage reduction in accordance with one embodiment of the invention.

FIG. 2 shows by way of example, data that is received by the cryptographic receiver 102 such as message data with cryptographic key packages 200 in the header 108. Key identification data 202 (KID1–KIDn) is included for each recipient of the message. In a public key cryptography based system, this may be for example the serial number of a public key certificate containing the public key used to create the key package, a hashed version of such a public key, a unique key identifier, or other information unique to the user or their key which may be used to associate a key package with a particular end-user, end-user public key, or public key certificate. Also, corresponding key data 204 (K1–Kn) is included with the key identification data 202 in the cryptographic key package 200. The cryptographic key packages 200 are sent with the encrypted message data 206, as known in the art. The memory storage reduction apparatus 100 in one embodiment, parses the header data containing the cryptographic key packages 200 and removes the cryptographic key package data that does not correspond to key identification data associated with a recipient, or memory storage reduction apparatus analyzing the received information. For example, if a recipient is assigned key data K2, such as encryption public key data, which is given key identification data KID2, all other cryptographic key packages are removed prior to being re-stored in memory 112. The re-stored information by the cryptographic key package removal stage 106 is represented generally as stored data 210. Hence if a recipient is one of one hundred recipients to an encrypted e-mail message or other encrypted data, upon receipt of the e-mail message, the memory storage reduction apparatus 100 may delete ninety nine of the one hundred cryptographic key packages (wrapped keys K1 and K3–K100 and associated KID data) in the header saving only the wrapped key, K2 and KID2, for the one recipient before restoring the wrapped key with the encrypted message for future use.

Referring back to FIG. 1, the header data parser 104, if desired, also analyzes the header data 108 to determine whether any of the cryptographic key packages includes key identification data or identification corresponding to a signature key for a given recipient. As such, the system detects for conditions where an improper encryption key was used for example, in the case of the RSA algorithm for where a signing key or signing identification data has been used instead of a preferred key. As such, the header parser 104 determines whether an encryption key used to encrypt encrypted data was an improper or undesirable key. If desired, the data parser 104 may instead look for any other defined public key or other data to determine if it was used as the encryption key.

The cryptographic key package removal stage 106 may also include a data re-encryptor, such as any suitable encryption process, that allows re-encryption of either message data and/or header data using a different encryption process, symmetric or asymmetric respectively. The encryption process may include for example the use of a longer encryption key (for either the encryption of the message body, header data, or both), or the use of a different encryption algorithm than that used to originally encrypt the received information, such as an RSA algorithm or other suitable algorithm, typically a public key algorithm. For example, the header parser could be used to convert from one-key-wrapping scheme to another. For example, if a received wrapped key has been encrypted using static Diffie-Hellman algorithm, the parser may unwrap the file key and re-wrap it using a different scheme, such as an RSA scheme for long term storage. This would allow for substitution of a more desirable or stronger scheme for long-term storage (e.g., 1024-bit RSA, whereas the received wrapped key may have been a 512-bit RSA or Diffie-Hellman key transfer). Other types of substitutions could alternatively be made, for example the use of RSA for key wrapping may be replaced by an Elliptic Curve Diffie-Hellman key wrapping in order to save storage space. For example, if the result of the latter algorithm results in a space savings. Substitute or replacement algorithms could thus be used for any number of reasons, including to improve security, achieve space savings, to conform with local security policy, to allow algorithm migrations or upgrades, to change between different formatting of the same algorithm (for example, RSA formatting per the PKCS No. 1 format versus the ANSI X9.31 format), and so on. As such, an improperly encrypted message is re-encrypted using a proper or preferred encryption public key and re-stored for the recipient's later use. Also, the data re-encryptor may increase the security strength of a given message by applying a stronger symmetric encryption process such as a triple DES process to message data encrypted using a less secure algorithm such as a single DES process. Since unnecessary header data is removed, the re-encryption is applied to only the header data for the given recipient instead of the entire received message and header data. Storage costs may be further reduced by decrypting the encrypted message data, compressing the decrypted data, and then re-encrypting the same data with either the same key and/or algorithm as before, or with a new key and/or algorithm. In the case that the same key and algorithm are re-used, the relevant key package in the header need not be modified (re-wrapped).

Figure 3:
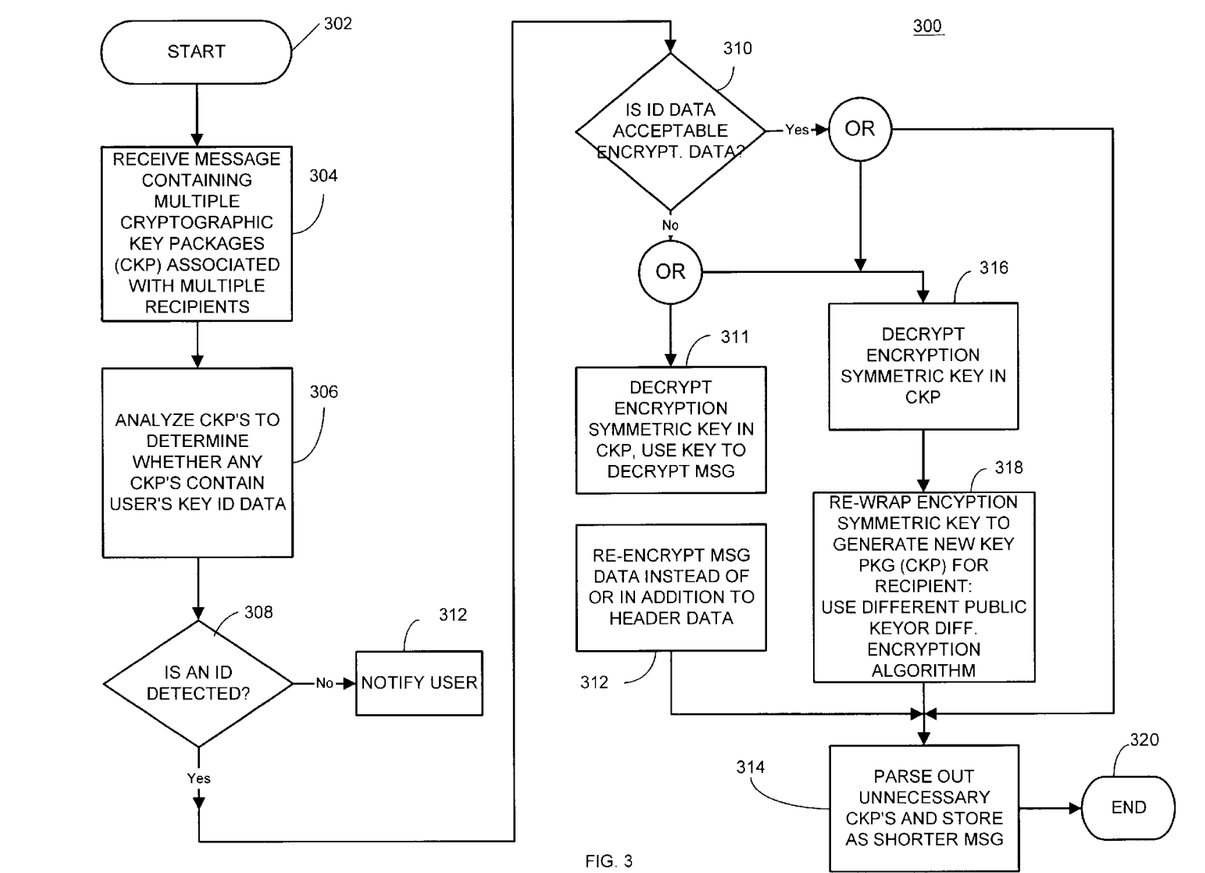
FIG. 3 is a flowchart illustrating an example of one embodiment of facilitating an encryption process in accordance with the invention.

FIG. 3 shows by way of example, methods for facilitating an encryption process 300 which may start, for example, in block 302 when the memory storage reduction apparatus 100 is awaiting receipt of an encrypted message. As shown in block 304, the cryptographic receiver 102 receives an encrypted message containing multiple cryptographic key packages associated with multiple recipients. The header parser 104 analyzes the cryptographic key packages to determine whether any cryptographic key packages contain a predefined recipient's identification data, as shown in block 306. As previously noted, when the header data parser 104 searches and analyzes the cryptographic key packages for key identification data or identification data corresponding to a signature key, it facilitates detection of the use of an improper or non-preferred encryption key, such as where a system uses signing certificate data instead of encryption certificate data.

As shown in block 308, if identification data corresponding to the predefined recipient is detected in the key packages, the header parser 104 determines whether the identification data represents encryption data or digital signing data as shown in block 310. It does this by, for example, using the identification data to locate corresponding keying material such as a public key pair or public key certificate, and then examining information associated with this keying material which indicates its intended usage. Such information may for example be specified in associated data records or in the key usage field in an X.509 version 3 certificate. If no corresponding identification data is detected, the user is notified, as shown in block 312, that the message does not concern the recipient. If the identification data does not indicate an acceptable encryption process, for example if signing key data has been used as encryption data, one of several methods may be used. In this context, "acceptable" may be determined by any of a number of criteria based on the type of process expected or preferred locally.

In one method, as shown in block 312, the cryptographic key package removal stage, which may include the re-encryptor, re-encrypts the message data instead of, or in addition to the header data, using a proper or preferred encryption key. In the case that a new asymmetric encryption process is required, the public encryption key may be obtained by the memory reduction apparatus 100 from a stored location based on the key identification data or other data in the message. For symmetric re-encryption, the symmetric key previously used may be re-used, or preferably a new random symmetric key may be obtained from a random number generator. For example this re-encryption may be based on the public encryption key obtained from an encryption public key certificate directory or locally stored certificates for the given recipient so that the message is properly encrypted, it may be based on a new message encryption key, it may be based on a different encryption algorithm to facilitate for example a higher level of security for the encrypted message, or to facilitate reduced storage or any other suitable re-encryption of the message data. In the case where message data is re-encrypted, the existing received encrypted message data must first be decrypted to obtain the plaintext. As shown in block 314, the header parser 104 parses out the unnecessary cryptographic key packages and stores the message data preferably with only the cryptographic key package for the given recipient.

Alternatively, if digital signing data is detected as being used as an encryption key, the memory reduction apparatus 100 decrypts the encryption symmetric key in the cryptographic key package containing the signing key data and re-wraps (encrypts) the encryption symmetric key to generate a new cryptographic key package for the recipient. This is shown in blocks 316 and 318. One way of detecting whether a key is preferred or improper is to check data fields in the certificate which indicate allowed usage. For example, this is commonly indicated in X.509 certificates by "key usage" bits. Also, the step of parsing can be done before or after re-encryption of the message, but in either case, the step of block 312 should be done first. Referring back to block 310, if the identification data is determined to be encryption data, again several methods may be used. One method includes decrypting the encryption symmetric key in the cryptographic key package containing the encryption data and re-encrypting the encryption symmetric key using a different encryption process to generate a new cryptographic key package for the recipient as shown in block 318. The different encryption process may involve either a different public key, or a different public key algorithm as well. If desired, as shown in FIG. 3., the header data parser 104 and data removal stage may parse and remove unnecessary cryptographic key packages and store the shorter message data as shown in block 314. A combination of removing unnecessary header data and re-encrypting the remaining header data and/or message data may also be performed. The method may end as shown in block 320 where the memory reduction apparatus waits for another message to be received.

Figure 4:
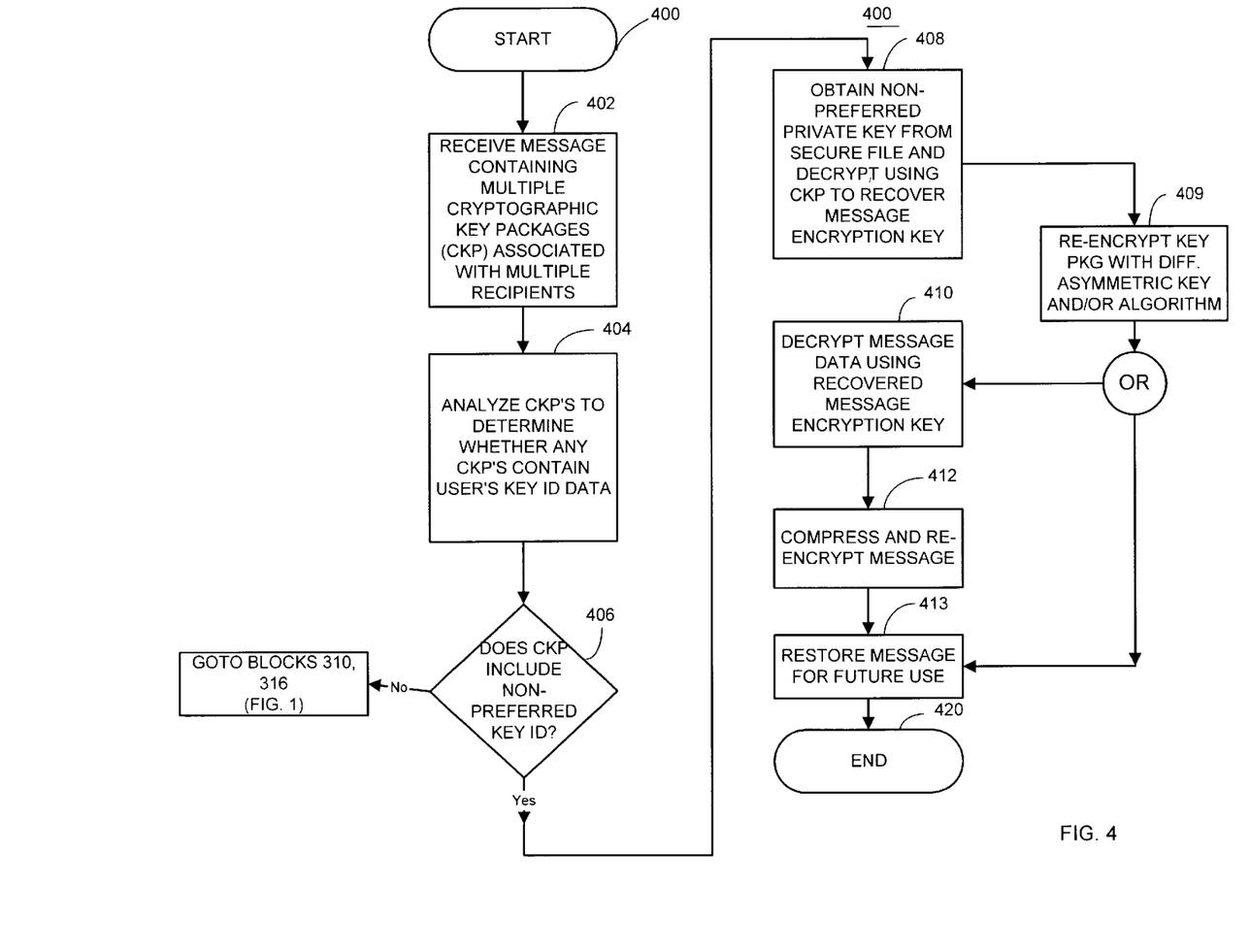
FIG. 4 is a flowchart illustrating another example of an embodiment of memory storage reduction in accordance with the invention.

FIG. 4 shows in more detail a method 400 that re-encrypts message data after detecting non-preferred encryption key usage. The first three blocks, 400, 402 and 404 are the same as blocks 302–306 as shown in FIG. 3. In block 406, the analyzer 103 (FIG. 1.) analyzes the received data to determine whether any of cryptographic key packages include digital signing key identification data (or other non-encryption key based data) associated with the given recipient. If no digital signing key identification data is found, the method analyzes the cryptographic key packages to determine whether acceptable encryption data was used, as shown for example in FIG. 3, block 310. The process may then continue through blocks 316, 318, and 314–320 as previously described or, if desired, once proper encryption data has been detected, the cryptographic key packages may be parsed and unnecessary cryptographic key packages are removed as shown in block 314.

Referring back to block 406, if the analyzer 103 detects that a parsed cryptographic key package includes non-preferred (for example, signing key) identification data associated with the recipient, the analyzer 103 obtains a corresponding private key from a secure file as shown in block 408. The corresponding private key (for example, signing key) is used to unwrap the cryptographic key package to recover a message encryption key as known in the art. The system may re-encrypt the key package with a different asymmetric key and/or algorithm as shown in block 409. The analyzer 103 may then decrypt the message data using the corresponding private key (e.g., signing key) and cryptographic key package to recover a message encryption key as known in the art. The message is then decrypted in any suitable manner using the message encryption key as shown in block 410. As shown in block 412, the message data is then compressed and re-encrypted by choosing any suitable encryption process. For example, re-encryption may be based on a new random message encryption key and a different symmetric encryption algorithm, by encrypting the message using the preferred encryption key, or creating an encryption header containing the cryptographic key package by encrypting the message encryption key with the public encryption key from a stored recipient public key certificate corresponding to a preferred public key algorithm. The message may then be restored for future use as indicated in block 413.

As an alternative, the step of block 409 may occur after blocks 410, 412 in the case that the process involves blocks 409, 410 and 412.

If desired, compression of the message can be done even if no changes are made to either the public key algorithm (wrapping) in the header, or to the symmetric encryption algorithm/key for the message (body). In this instance, the process may delete the unnecessary header cryptographic key packages and compress the message data which includes unwrapping the key package to obtain the decryption key, decrypting the encrypted message data, compressing the recovered plaintext data, then re-encrypting the compressed data.

For example, where an incoming message is encrypted under algorithm X with symmetric key Y wrapped (encrypted) with asymmetric key Z, the system may decrypt asymmetrically to recover the symmetric key Y, and re-encrypt the symmetric key Y with a different asymmetric key Z' and replace the previous cryptographic key package with the new re-encrypted key data forming a new cryptographic key package in the header. The message data with the new cryptographic key package may then be stored. This is to accomplish re-encrypting of the header without re-encrypting the file itself, thereby only changing the wrapping on the header key. The public key algorithms corresponding to the keys Z and Z' may be the same algorithm such as an RSA encryption algorithm or one key may correspond to an RSA encryption algorithm, and the other may be a different algorithm such as ElGamal encryption, a store- and- forwarded version of a Diffie-Hellman based encryption process, elliptic curve Diffie-Hellman encryption process or any other suitable encryption process.

Also, the step of re-encrypting recipient encryption keys may include generating a cryptographic key package by encrypting a message encryption key with a public encryption key from a public key certificate. The symmetric encryption may be performed using different encryption algorithms, for example, DES, Triple DES, and any other suitable encryption algorithm.

In addition, the re-encrypted message may be compressed using a data compressor such as any suitable compression algorithm and restored in memory for future use. Compression of message data is done after the plaintext is recovered (following decryption), and prior to re-encryption. That is, the plaintext data is always s compressed, rather than cyphertext. Compressing the data reduces the amount of data to process and/or store and therefore reduces memory storage requirements, bandwidth requirements and subsequent processing load. The method ends as shown block 420 where the system waits for another message to arrive.

In another embodiment, the storage reduction device and methods may be included and performed by a gateway server that receives multiple wrapped keys and message data for a number of recipients prior to being distributed to any recipients. In this way, the gateway computer or other computer performs the necessary operations to reduce the memory storage required by a given recipient by removing unnecessary key packages associated with other recipients. In addition, it may be desirable to remove all wrapped keys for several different recipients or remove some of the cryptographic key packages for selected recipients so that each recipient need not analyze all wrapped keys. This may balance overhead requirements among the recipients and a gateway server, for example.

Based on the foregoing, the disclosed systems and methods may provide detection and removal of unnecessary data relating to encryption keys prior to storing the data after receipt of the encrypted information from a sender and/or detection of whether a proper encrypting process was used. In one embodiment, the invention determines whether an improper encryption key was used to encrypt encrypted data and re-encrypts the encrypted data with a different encryption process in response to detected improper encryption key usage.

Figure 5:
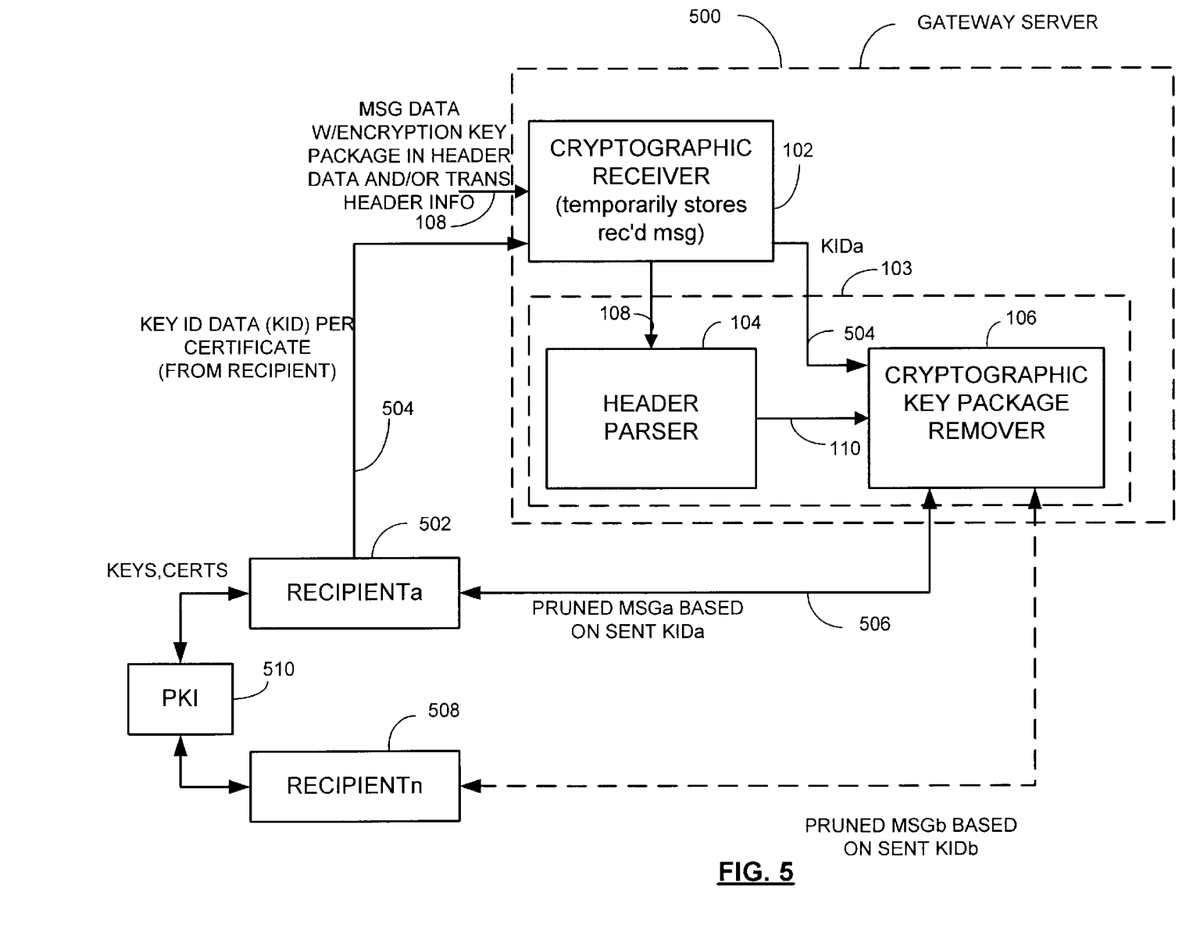
FIG. 5 is a block diagram illustrating another example of a system according to another embodiment of the invention.

FIG. 5 illustrates one example of an apparatus for facilitating data bandwidth reduction 500, such as a gateway server, a non-server, or any other suitable processing device. The apparatus 500 may include the cryptographic receiver 102, header parser 104 and cryptographic key package remover 106, as previously described. However, in this embodiment, the apparatus receives, from at least one of the plurality of recipients 502, first key identification data 504 associated with the recipient 502. For example, the recipient 502 or an agent acting on behalf of that recipient sends the key identification data 504 in the form of a request for e-mail messages containing cryptographic key packages associated with the key ID data 504 sent by the recipient or agent 502. The key ID data 504 as described above may be associated with a certificate associated with a recipient 502. The cryptographic key package remover 106 removes the cryptographic key package or packages that do not correspond to the first key identification data 504 to generate a pruned message 506. For example, the KID may be key packages, transport information or any suitable information. If transport header Ids are used as the KID, pruning is based on comparing transport IDs instead of key packages and assumes an ordering (mapping) of transport header ID with key packages. The pruned message 506 may contain, for example, a cryptographic key package corresponding to the recipient 504 and removes all cryptographic key packages except the key package or packages corresponding to the predetermined recipient such as recipient 502. A plurality of other recipients 508 may also provide key identification data to the apparatus 500. The recipients 502 and 508 may be operatively coupled to a public key infrastructure 510 as known in the art. Accordingly, in this embodiment, the cryptographic receiver may temporarily store the message data 108 in memory pending a request from a recipient based on key ID data 504 after which a pruned message 506 is generated based on the sent key identification data 504 and the recipient 502. Since the recipients perform on-demand operation by sending the given key identification data, the apparatus 500 need not maintain a library of key identification data for all recipients.

Figure 6:
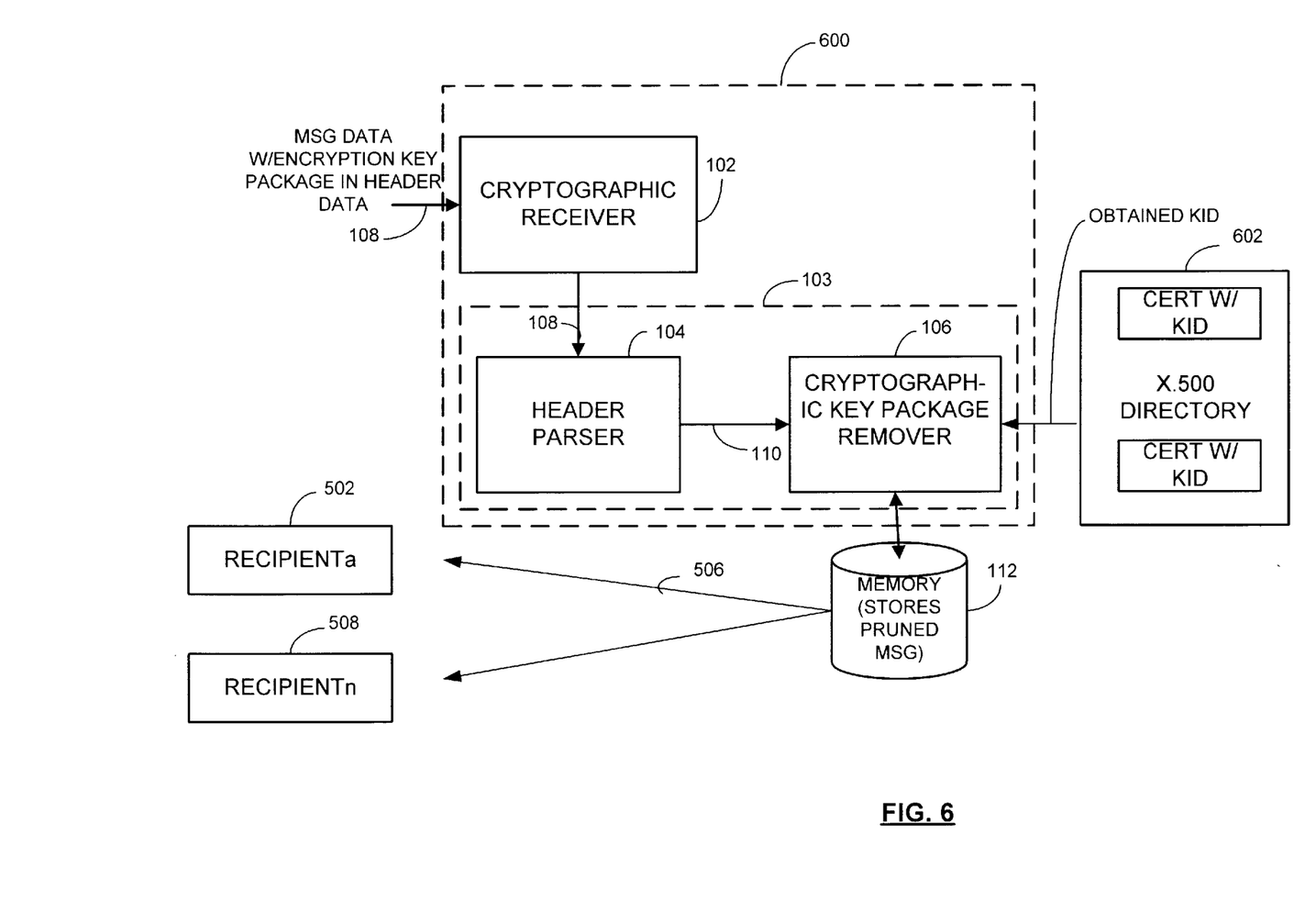
FIG. 6 is a block diagram illustrating an example of a system according to yet another embodiment of the invention.

FIG. 6 illustrates another embodiment of an apparatus 600 that facilitates data bandwidth reduction by sending the pruned message 506 to the suitable recipient. However, in this embodiment, the recipient does not send an on-demand request containing key identification data. Instead, the apparatus 600 temporarily stores the received data 108 and retrieves from a directory 602, such as an X.500 directory, an LDAP repository, or any other suitable storage structure, key identification data associated with a predetermined recipient to which the pruned message will be sent. In an alternative embodiment, the apparatus 600 retrieves from a database, a mapping that links IDi in the transport header to KIDj in one or more of the key packages. As known in the art, a recipient can be predetermined in any suitable manner. For example, a server associated with a particular domain knows which recipients are inside and outside the domain. Also, a known list of recipients may be used.

Figure 7:
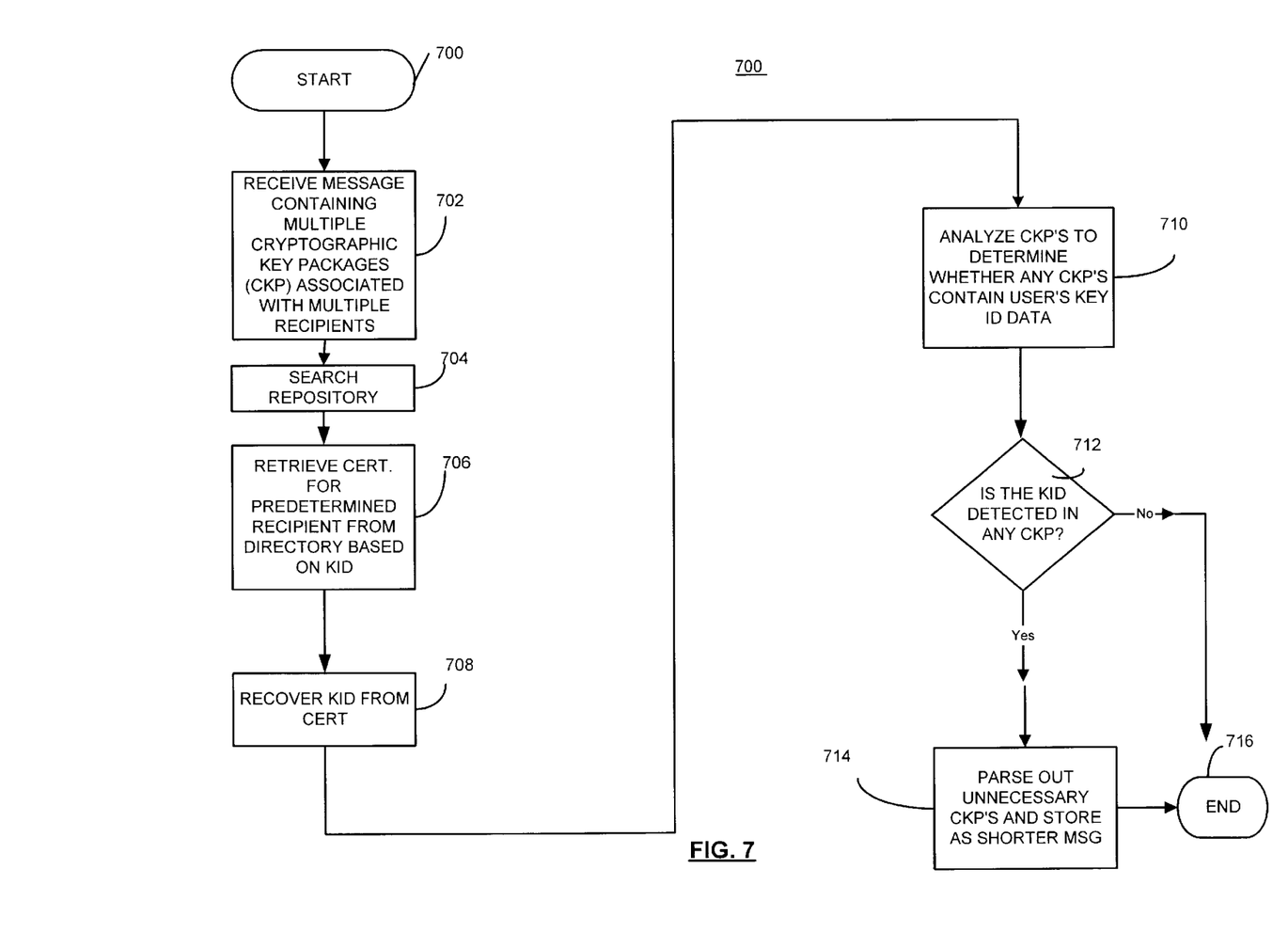
FIG. 7 is a flowchart illustration one example of a memory bandwidth reduction process in accordance with one embodiment of the invention.

Referring to FIG. 7, the apparatus 600 or any other suitable apparatus or system may operate as shown by process 700. As shown in block 700, the process is initialized. As shown in block 702, the process includes receiving the message contained in multiple cryptographic key passages associated with multiple recipients. As shown in block 704, the method includes searching a repository, such as directory 602, to obtain a certificate containing the key identification data desired by the apparatus 600, or some other suitable mapping to the key identification data. The apparatus 600 may decide which certificate to obtain based on a request from a recipient, or any other suitable criteria. As shown in block 706, the method includes retrieving a certificate for a predetermined recipient from the directory 602 based on, for example, key recipient identification information, identification information from the list of intended recipients of the message and/or message transport header, or other data. As shown in block 708, the process includes recovering the key identification data from the retrieved certificate or other data capable of identifying key packages. As shown in block 710, the process includes analyzing cryptographic key packages of a message to see if they contain the user's key identification data as obtained from the certificate in a directory or other source. If the key identification data obtained from a database, such as a directory, other search repository, or any other source that is separate from the received message is detected in a cryptographic key package from received message data, the process continues as noted above by parsing out (e.g., removing) at least some of the unnecessary cryptographic key packages and storing as a pruned message, the cryptographic key package associated with the key identification data, as shown in block 714. For example, other criteria may be used to allow pruning of a subset of unnecessary cryptographic key packages. By way of example, if a message is sent to a large number of people at corporation A and corporation B, unnecessary cryptographic key packages from corporation A can be removed while keeping the necessary cryptographic key packages of corporation B in the message. The process then continues as shown in block 716, waiting for another message. Accordingly, key identification data need not be transmitted from the recipient. Instead, the apparatus 600 automatically obtains the key identification data from a directory or other database search based on a certificate or other data retrieval process. One way this may done is to use the ID information from the transport header. A second way would be for the recipient to send its name (see FIG. 5) as opposed to specific KID.

As noted above, the sender constructs a message such that the recipient identifying information in the transport header ID1, . . . IDn has a one-to-one mapping to the key packages such that IDi corresponds to key package (KIDi,Ki). Therefore, pruning of the message for the recipient identified by IDi, consists of removing key packages (KID1,K1), . . . , (KIDi−1,Ki−1), (KIDi+1,Ki+1), . . . , (KIDn,Kn). Accordingly, pruning may be performed on the transport header (information received) without a request.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for reducing data transmission bandwidth comprising the steps of:

receiving data containing header data wherein the header data includes a plurality of cryptographic key packages associated with multiple recipients;

storing the received data;

receiving, from at least one of the multiple recipients, first key identification data associated with the at least one of the multiple recipients;

parsing the header data to determine whether at least one of the plurality of cryptographic key packages corresponds to the first key identification data;

removing at least some cryptographic key packages not corresponding to the first key identification data to produce a pruned response based on the received first key identification data; and sending the pruned response to the at least one of the multiple recipients.

2. The method of claim 1 wherein at least one cryptographic key package includes at least one symmetric encryption key wrapped with an asymmetric encryption key.

3. The method of claim 1 wherein the data also contains message data and wherein the method further includes the step of re-storing the parsed header data with encrypted message data for future use.

4. The method of claim 1 wherein the step of removing at least some cryptographic key packages includes removing all cryptographic key packages except the cryptographic key package corresponding to the at least one of the multiple recipients.

5. The method of claim 1 including the step of decrypting, compressing, and re-encrypting the message data prior to restoring the encrypted message.

6. The method of claim 1 wherein the first key identification data includes one of at least transport header information and a cryptographic key package.

7. A method for reducing data transmission bandwidth comprising the steps of:

receiving data containing header data wherein the header data includes a plurality of cryptographic key packages associated with multiple recipients;

storing the received data;

retrieving, from a database, first key identification data associated with a predetermined recipient;

parsing the header data to determine whether at least one of the plurality of cryptographic key packages corresponds to the first key identification data;

removing at least some cryptographic key packages not corresponding to the first key identification data to produce a pruned response based on the received first key identification data; and sending the pruned response to the predetermined recipient.

8. The method of claim 7 including the step of storing the pruned response.

9. The method of claim 7 wherein at least one cryptographic key package includes at least one symmetric encryption key wrapped with an asymmetric encryption key.

10. The method of claim 7 wherein the data also contains message data and wherein the method further includes the step of re-storing the parsed header data with encrypted message data for future use.

11. The method of claim 7 wherein the step of removing at least some cryptographic key packages includes removing all cryptographic key packages except the cryptographic key package corresponding to the predetermined recipient.

12. The method of claim 7 including the steps of decrypting, compressing, and re-encrypting the message data prior to restoring the encrypted message.

13. An apparatus for facilitating data bandwidth reduction comprising:

means for receiving data containing header data wherein the header data includes a plurality of cryptographic key packages associated with multiple recipients and for receiving, from at least one of the multiple recipients, first key identification data associated with the at least one of the multiple recipients;

means, operatively coupled to the receiving means, for parsing the header data to determine whether at least one of the plurality of cryptographic key packages corresponds to key identification data for the at least one of the multiple recipients; and means, operatively coupled to the parsing means, for removing at least some cryptographic key packages not corresponding to the first key identification data received from the at least one of the multiple recipients.

14. The apparatus of claim 13 wherein at least one cryptographic key package includes at least one symmetric encryption key wrapped using an asymmetric encryption key.

15. The apparatus of claim 13 wherein the data also contains message data and wherein the apparatus includes means for re-storing the parsed header data with encrypted message data for future use.

16. The apparatus of claim 13 wherein the means for removing at least some cryptographic key packages removes all cryptographic key packages except the cryptographic key package corresponding to the predetermined recipient.

* * * * *